United States Patent [19]

Lynch

[11] Patent Number: 5,114,484

[45] Date of Patent: May 19, 1992

[54] WATER-IN-WATER MULTICOLOR PAINT AND PROCESS FOR MAKING SAME

[75] Inventor: James F. Lynch, Schaumburg, Ill.

[73] Assignee: Multicolor Specialties, Inc., Cicero, Ill.

[21] Appl. No.: 586,762

[22] Filed: Sep. 21, 1990

[51] Int. Cl.$^5$ .............................................. C09D 5/29
[52] U.S. Cl. ...................................... 106/170; 106/24;
106/26; 106/124; 106/163.1; 106/191; 106/253; 106/311
[58] Field of Search ................. 106/26, 24, 124, 163.1, 106/170, 191, 253, 311

[56] References Cited

U.S. PATENT DOCUMENTS

| | | |
|---|---|---|
| 3,811,904 | 5/1974 | Zola ...................................... 106/288 |
| 3,852,076 | 12/1974 | Grasko ................................... 106/26 |
| 3,950,283 | 4/1976 | Sellars et al. ........................ 106/170 |
| 4,376,654 | 3/1983 | Zola ...................................... 106/170 |

FOREIGN PATENT DOCUMENTS 1298201 11/1972 United Kingdom .

Primary Examiner—William R. Dixon, Jr.
Assistant Examiner—Scott L. Hertzog
Attorney, Agent, or Firm—Olson & Hierl

[57] ABSTRACT

A water-in-water multicolored paint composition is provided having a disperse phase and a continuous phase. The disperse phase preferably is comprised of water soluble, film-forming, crosslinkable, carboxylated polymer; crosslinking agent; hydroxy (lower alkyl) cellulose; cationic quaternized water soluble cellulose ether; peptized clay; and water. The continuous phase preferably is comprised of a gel of peptized clay and water. Methods for preparing the paint are also provided.

17 Claims, 1 Drawing Sheet

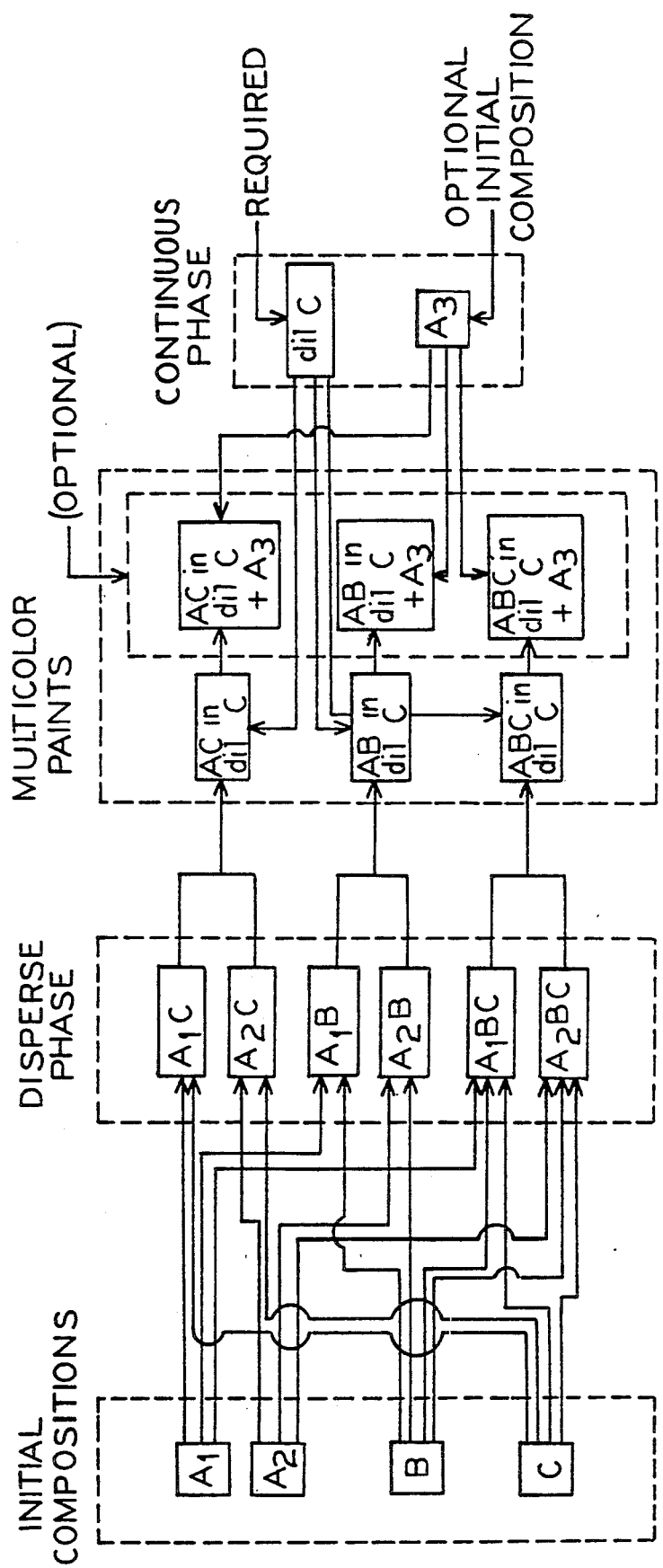

WATER-IN-WATER MULTICOLOR PAINT AND PROCESS FOR MAKING SAME

FIELD OF THE INVENTION

The present invention is directed to a water-in-water multicolor paint emulsion which, when applied as a surface coating and dried, produces a coated surface having excellent characteristics, particularly water resistance.

BACKGROUND OF THE INVENTION

A multicolor paint is a paint which, when coated on a surface and dried, results in a coating that is characterized by dispersed discrete spots (or dots). Water-in-water multicolor paints have heretofore been proposed (see, for example, Sellars et al. U.S. Pat. No. 3,950,283, Grasko U.S. Pat. No. 3,852,076 and Zola U.S. Pat. No. 4,376,654) and are of commercial interest particularly in view of the developing governmental interest in establishing regulations limiting the quantity of organic volatiles emitted into the surrounding environment by a paint during application and subsequent air drying. The state of California, for example, is reportedly considering the adoption of regulations limiting such paint emissions.

It is difficult to prepare a commercially acceptable water-in-water multicolor paint because of various problems. One problem is the fact that the discrete color bodies comprising the disperse phase in such a paint need to contain a relatively high concentration of a water soluble, film-forming polymer in order to achieve commercially acceptable characteristics in a coating made therewith. Another problem is that such polymers should be in a highly water insoluble state after the paint has been coated and dried; otherwise, the coated and dried paint provides little or no water resistance. Another problem is to prepare and utilize a disperse phase composition which can be formed into discrete color bodies that have sufficient structural integrity in the continuous phase of the paint for practical commercial purposes. Structurally weak discrete color bodies would break up easily and become part of this continuous phase.

Prior art multicolor paints commonly contain a solution or dispersion of a film-forming polymer in an organic liquid carrier with such polymer being, for example, nitrocellulose or styrene butadiene, and such carrier liquid being mineral spirits or the like. However, the solubility and dispersibility of such polymers in water is so small as to make it impossible to use such polymers in making a water-based paint of commercially acceptable quality. It is also not practical to "fortify" the water with a water-miscible organic co-solvent to enhance polymer solubility or dispersibility because the maximum amount of the organic co-solvent which can be present should be kept below about 3 weight percent on a total product paint composition basis in order to comply with the foregoing proposed regulatory standards.

So far as now known, no one has previously succeeded in preparing a water-in-water multicolor paint wherein the aqueous disperse phase color bodies are characterized by having:

(a) a relatively high content of water soluble film-forming crosslinkable polymer in association with a crosslinking agent, (b) a relatively high structural integrity, and (c) a capacity to form highly crosslinked water insoluble coatings after paint application and drying.

SUMMARY OF THE INVENTION

The present invention provides an improved water-in-water multicolor paint having a continuous phase and a disperse phase, and wherein disperse phase bodies provide the foregoing combination of characteristics.

The invention further provides improved multicolored surface coatings produced from the application and drying of such a multicolored paint.

In the disperse phase bodies thereof, there is incorporated a mixture of dissolved polymeric materials comprised of:

(a) water dispersable, film-forming, cross-linkable, carboxylated polymer, and (b) hydroxy (lower alkyl) cellulose and/or alkali metal carboxyl (lower alkyl) cellulose.

Additionally present in the discontinuous phase bodies is a cross-linking agent for the cross-linkable polymer which agent is selected from the class consisting of water dispersable multifunctional carbodiimides and water dispersable polyfunctional aziridines. Also, a pigment is optionally but preferably present in the disperse phase bodies.

Also present in the discontinuous phase bodies is at least one of either a cationic quaternized cellulose ether, or an aqueous gel that is comprised of a water swellable clay, a peptizing agent, and water. Preferably both such materials are present. When an aqueous gel is present, the water swellable clay is preferably a synthetic hectorite clay and the peptizing agent is preferably tetrasodium pyrophosphate. These agents not only thicken, but also improve the structural integrity of the disperse phase bodies.

Optionally, but preferably, also present in the discontinuous phase bodies are conventional paint additives including plasticizers, silicone bonding agents, antifoaming agents, wetting agents, and/or the like.

The disperse phase bodies are dispersed in a continuous phase that comprises an aqueous gel which is likewise comprised of a water-swellable clay, a peptizing agent and water; and, likewise, the clay is preferably a synthetic hectorite clay, and the peptizing agent is preferably tetrasodium pyrophosphate.

The presently most preferred such carboxylated polymer is a carboxylated styrene acrylate copolymer, and the presently most preferred crosslinking agent is a multifunctional carbodiimide. Such a combination displays excellent high mutual water dispersability, film-forming capacity, and dried film water resistance.

The inventive multicolor paints characteristically display excellent shelf life stability and the capacity to form water resistant coatings when the paint is applied and dried as a surface layer.

Also, the inventive multicolor paints are characterized by a sufficiently low content of volatile organic components to be acceptable under certain proposed governmental regulations concerning paints and coatings.

So far as now known, neither water-in-water multicolor paints, nor the dried coatings produced therefrom, have previously been developed with such characteristics.

Other and further objects, aims, purposes, features, advantages, embodiments, and the like will be apparent to those skilled in the art from the present specification taken with the appended claims.

BRIEF DESCRIPTION OF DRAWINGS

In the drawing, a flow sheet is shown illustrating blending sequences suitable for use in practicing the present invention.

DETAILED DESCRIPTION

(a) Definitions

The term "water dispersable" as used herein in reference, for example, to carboxylated polymer or cross-linking agent or like material, means that such a material can form a water solution or a colloidal suspension in water. However, to enhance the water dispersability of such a material, and to increase the amount of such material which is present in a water dispersed form in the disperse phase of a multicolor paint of this invention, the water is preferably admixed with a water miscible organic liquid, such as hereinafter characterized and illustrated, wherein, for example, the polymer or other material, is at least as dispersable as in water. Preferably, such a polymer or other material is characterized by a capacity to disperse in water-miscible organic solvents to an extent similar to that of the material dispersability in water alone.

The term "cross-linkable" as used herein in reference to a water dispersable carboxylated polymer means that such a polymer, after being applied to a surface from an aqueous coating composition and allowed to form a film or coating, crosslinks and becomes water insoluble through reaction with a water dispersable crosslinking agent which is also present in the aqueous coating composition. The cross-linking occurs preferably during the drying which takes place after the aqueous coating composition of the polymer and the crosslinking agent are applied as a coating to such surface and the aqueous carrier of the coating composition is evaporated. Also, the cross-linking preferably occurs at ambient temperatures and pressures, although heat may be used to accelerate the drying and crosslinking reaction.

The term "storage stability" as used herein with reference to a multicolor paint of this invention means that such a paint passes the test procedure of ASTM D-1849-80 which test relates to package stability of paint stored in a 1 quart or 1 liter container at 125°±2° F. (52°±1° C.) for 1 month or 2, months respectively, as regards consistency and settling.

The term "structural integrity" as used herein in relation to a multicolor paint and the disperse phase bodies therein refers to the ability of the disperse phase bodies therein to remain stable and substantially unchanged when subjected at ambient temperature and pressure to a shear mixing force exerted by a Cowles mixing blade operating at about 450 to about 500 rpm.

As used herein, the term "water resistance" as used herein in reference to a coated and dried film or coating produced from a multicolor paint of this invention has reference to the test procedure of ASTM D-1308-79 as regards both covered and open spot tests.

The term "paint" is used herein in the broad sense of a coloring and coatable substance for spreading as a coating on a surface.

(b) Starting Materials

The water dispersable, film-forming, crosslinkable, carboxylated polymers which are employed as starting materials in the practice of this invention are generally known in the prior art and do not as such constitute part of the present invention. Some examples of such polymers are shown in Table I below. Typically and preferably, such a polymer contains at least about 2 weight percent of carboxyl groups on a 100 weight percent total polymer weight basis, and more preferably at least about 3 weight percent. Preferably, such a polymer does not contain more than about 7 weight percent of carboxyl groups (same basis).

TABLE 1

CROSS LINKABLE, WATER SOLUBLE, FILM FORMING POLYMERS

| Ident. No. | Chemical Name | Trade Name/ Trade Mark | Manufacturer/ Source |
|---|---|---|---|
| 1. | Carboxylated Styrene Acrylate Copolymer | "Piliotite" 7103 & 7104 | Goodyear |
| 2. | Carboxy-Modified Acrylic | "Hycar" 26171 | B. F. Goodrich |
| 3. | Carboxy-Modified Acrylic | "Hycar" 26137 | B. F. Goodrich |
| 4. | Carboxy-Modified Acrylic | "Hycar" 26322 | B. F. Goodrich |
| 5. | Carboxy-Modified Acrylic | "Hycar" 26083 | B. F. Goodrich |
| 6. | Carboxy-Modified Acrylic | "Hycar" 26092 | B. F. Goodrich |
| 7. | Carboxy-Modified Acrylic | "Hycar" 2671 | B. F. Goodrich |
| 8. | Carboxy-Modified Acrylic | "Hycar" 26796 | B. F. Goodrich |
| 9. | Carboxy-Modified Acrylic | "Hycar" 26084 | B. F. Goodrich |
| 10. | Carboxy-Modified Acrylic | "Hycar" 26091 | B. F. Goodrich |
| 11. | Carboxy-Modified Acrylic | "Hycar" 26288 | B. F. Goodrich |
| 12. | Carboxy-Modified Acrylic | "Hycar" 26106 | B. F. Goodrich |
| 13. | Carboxy-Modified Acrylic | "Hycar" 26172 | B. F. Goodrich |
| 14. | Carboxy-Modified Vinyl Chloride | "Geon" 460x6 | B. F. Goodrich |
| 15. | Carboxy-Modified Vinyl Chloride | "Geon" 460x45 | B. F. Goodrich |
| 16. | Carboxy-Modified Vinyl Chloride | "Geon" 460x46 | B. F. Goodrich |
| 17. | Carboxy-Modified Vinylidene Copolymer | "Geon" 450x61 | B. F. Goodrich |
| 18. | Carboxy-Modified High Acrylonitrile | "Hycar" 1571 | B. F. Goodrich |
| 19. | Carboxy-Modified Special Acrylonitrile | "Hycar" 1570x75 | B. F. Goodrich |
| 20. | Carboxy-Modified Special Acrylonitrile | "Hycar" 1572 | B. F. Goodrich |
| 21. | Carboxy-Modified Special Acrylonitrile | "Hycar" 1578 | B. F. Goodrich |
| 22. | Carboxy-Modified Styrene Butadiene | "Goodrite" 257ox59 | B. F. Goodrich |
| 23. | Carboxy-Modified Vinyl Acetate | "Polyco" 2149c | Borden |
| 24. | Carboxy-Modified Vinyl Acetate | "Polyco" 2142 | Borden |
| 25. | Carboxy-Modified Styrene Butadiene | "Darex" 5101 | W. R. Grace |
| 26. | Carboxy-Modified Styrene Butadiene | "Darex" 5261 | W. R. Grace |

As indicated above, a carboxylated styrene acrylate copolymer is the presently preferred carboxylated polymer type for employment in the practice of the present invention. For example, this product available from Goodyear under the trademark "Pliolite" 7103 and 7104 apparently contains about 65% by weight styrene and about 35% by weight of butyl acrylate and is cartoxylated to an extent sufficient to contain about 3 to 4 weight percent carboxyl groups on a 100 weight percent total polymer weight basis.

Such a polymer, for example, can be comprised of about 50 to about 75 weight percent styrene and correspondingly about 25 to about 50 weight percent of at least one (lower alkyl) acrylate monomer on a total polymer weight basis. The acrylate monomer is preferably n-butyl acrylate. Such a polymer is characterized by the feature that, after its formation, it contains pendant carboxylic functional groups which are reactive with a multifunctional carbodiimide or with a polyfunctional aziridine to produce a cross-linked, water-insoluble product. The molecular weight of the starting polymer is low enough to permit the polymer to be water dispersable.

The hydroxy (lower alkyl) cellulose materials employed in the practice of this invention as starting materials are generally known in the prior art and do not as such constitute a part of the present invention. As used herein, the term "lower alkyl" generally refers to an alkyl moiety containing from (and including) one through four carbon atoms. Presently most preferred as a cellulose type additive material for use in this invention is hydroxyethyl cellulose, which is available commercially under the trademark "Cellosize" from the Union Carbide Chemicals Company. Such a material is a nonionic, water-soluble cellulose ether which is believed to be interactive with peptized water swellable clays in aqueous gels, thereby aiding in the formation and maintenance of the disperse phase bodies in a multicolor paint composition of this invention. Hydroxy propyl cellulose is also useful, for example.

The alkali metal carboxy (lower alkyl) cellulose materials employed in the practice of this invention as starting materials are generally known to the prior art and do not as such constitute a part of the present invention. Presently a most preferred alkali metal carboxy (lower alkyl) cellulose is sodium carboxy methyl cellulose. One such material is available commercially as "CMC-7-7H3SF" from the Aqualon Company.

The cationic quaternized cellulose materials employed in the practice of this invention as starting materials are also generally known in the prior art. These polymeric materials are available commercially, for example, from Union Carbide Corporation under the trademark "Polymer JR" or "UCARE Polymer" in a variety of viscosity grades. These materials are also known as, and designated by, the CTFA (that is, the Cosmetic, Toiletry and Fragrance Association, Inc.) as "Polyquaternium-10" which is defined as a polymeric quaternary ammonium salt of hydroxyethyl cellulose that has been reacted with a trimethyl ammonium substituted epoxide. Such a cationic, water-soluble cellulose ether is theorized to be interactive with at least one other component present in the disperse phase bodies employed in a paint of the present invention; however, the nature of this interreaction is not now known.

The pigment employed in the practice of this invention as a starting material can be selected from among the various pigments known in the prior art. Preferably, the pigment is in the form of dispersible particles having ultimate particle sizes in the submicron range. The pigment should preferably also be substantially insoluble in water or in organic solvents. While a pigment should have a positive colorant value, it can be organic, inorganic, or a mixture of organic and inorganic materials. If desired, as those skilled in the art will appreciate, the pigment can be prepared preliminarily as a slurry, dispersion, or the like in water and/or organic liquid for purposes of simple mechanical blendability. Presently preferred pigments include, for example, titanium dioxide; lamp black; carbon black; bone black; phthalocyanine blue; phthalocyanine green; various organic and inorganic yellow pigments, such as, for example, D & C yellows including quinoline yellow, yellow iron oxide, and the like; various organic and inorganic red pigments, such as, for example, D & C reds including quinacridone red and red iron oxide, respectively, and the like; etc.

The dispersible, water swellable clays employed in the practice of this invention can be selected from among the various known such clays, both natural and synthetic. Preferably, the clay selected is a silicate which has an ultimate particle size in the submicron range. Examples of suitable clays include synthetic silicate clays resembling hectorite and/or saponite, montmorillonite, beidellite, nontronite, sauconite, stevensite, smectite and other inorganic minerals which are characterized by a tendency to swell by absorbing water between adjacent crystal layers, and to split into charged fragments capable of forming colloidal dispersions. A presently most preferred silicate clay is a synthetic sodium magnesium lithium silicate hectorite-type clay. This material is obtainable commercially from Waverly Mineral Products of Balacynwyd, PA which is a subsidiary of La Porte Inc. of the United Kingdom under the trademark designation "Laponite" RD or RDS. Other suitable hectorite clays are available commercially from the R. T. Vanderfilt Company under the trademark "Veegum T", or from the Baroid Div., National Lead Company under the trademark "Macaloid".

The above described clays are employed in the practice of this invention in combination with a water soluble peptizing agent. Such an agent induces the clay to form a stable colloidal aqueous dispersion. Use of such an agent is conventional with such clays. Examples of known water soluble peptizing agents include ammonium hydroxide, hydrogen peroxide, sodium carbonate, sodium citrate, sodium hydroxide, sodium oxalate, sodium silicate, sodium tripolyphosphate, sodium hexametaphosphate, tetrasodium pyrophosphate, and the like. The last named peptizing material is presently preferred for use in the practice for this invention.

The multicolor paint compositions of this invention contain in the disperse phase a crosslinking agent which is effective for crosslinking the carboxylated crosslinkable polymers involved. Suitable water dispersable cross linking agents for use in this invention which can interreact with such polymers at ambient temperatures and pressures are preferably polyfunctional aziridines and multifunctional carbodiimides (the latter class being presently preferred). Such materials are known in the prior art and are available commercially. These materials as such do not form a part of the present invention.

Carbodiimides (sometimes also called cyanamides) are a well-known class of organic compounds believed to have the general structure:

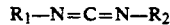

where $R_1$ and $R_2$ are each an organic moiety. Carbodiimides crosslink with carboxylic acid groups to form N-acyl ureas.

A presently preferred carbodiimide is available commercially from Union Carbide under the trademark "UCARLNK XL-25 SE" which is designated as "multifunctional" and is designed for use as a low-temperature crosslinking agent for polymers such as carboxylated polymers.

Aziridines are organic compounds based on the ring structure:

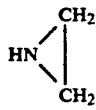

A presently preferred crosslinking polyfunctional aziridine is "ZAMA-7" which is designated "polyfunctional" and is available commercially from Hoechst Celanese and also from Virginia Chemicals. This material also is designed for use as a low-temperature crosslinking agent for polymers such as carboxylated polymers.

The disperse phase bodies in a multicolor paint of this invention preferably incorporate a water-miscible organic liquid as a co-solvent in combination with the water employed therein. Any convenient water miscible organic liquid can be used, but presently preferred such liquids include ester alcohols, such as the material available commercially from Eastman Kodak Company under the trademark "Texanol"; glycol ethers, such as diethylene glycol butyl ether, which is available from Union Carbide Corporation under the trademark "Butyl Carbitol"; and ethylene glycol butyl ether, which is available from Union Carbide Corporation under the trademark "Butyl Cellosolve"; and the like.

(c) Preparation of Blending Compositions

It is convenient and presently preferred to prepare three compositions initially, which are designated respectively as "Composition A", "Composition B" and "Composition C", each of which is described below.

Composition A

Composition A is conveniently prepared by preliminarily dissolving the water dispersable, film-forming, crosslinkable carboxylated polymer and the hydroxy (lower alkyl) cellulose in a water/cosolvent mixture. Thereafter, the pigment when used is conveniently dispersed in the resulting mixed solution.

Typically, but preferably, Composition A also includes various optional additives of the type conventionally used in paint formulations, such as plasticizers, bonding agents, antifoaming agents, wetting agents, fungicides, neutralizers and the like. It can be regarded as a feature of the present invention that such additives can be used effectively in a multicolor paint of this invention and can achieve their respective known effects without adversely affecting such desirable paint properties as formulatability, storage stability, applied dried coating water resistance, disperse phase body structural integrity, or the like.

Examples of suitable plasticizers preferably include monomeric plasticizers, such as phthalates like dibutyl phthalate, diisodecyl phthalate, dioctyl phthalate, tricresyl phosphate, butyl benzyl phthalate, and the like. Other suitable monomeric plasticizers can be selected from among the adipates, sebacates, glycolates, castor oils, and the like.

Examples of suitable bonding agents include epoxidized siloxanes, such as a glycidyl silane like glycidoxy trimethoxy silane, and the like.

Examples of suitable antifoaming agents include the materials available commercially from Henkel under the trademarks "Foamaster VL" "Dehydran 1293", "Nopco" NXZ, and the like.

Examples of suitable wetting agents include polycarboxylic acid salts such as are available from Rohm and Haas under the trademark "Tamol" 165 and also the materials that are available commercially from Rohm and Haas under the trademark "Triton", especially the products CF10 and X100.

The preferred compositional characteristics of a Composition A are shown in Table II below:

TABLE II

| | Composition A | | |
|---|---|---|---|
| | | Weight Percent 100 basis wt. % | |
| Ident. No. | Component | Broad (about) | Preferred (about) |
| 1 | Carboxylated Polymer | 10–40% | 14–16% |
| 2 | Hydroxy (alkyl) cellulose | 0.5–2.0% | 0.75–1.25% |
| 3 | Cross linking agent | 0.5–10% | 5–6% |
| 4 | Water | 3–50% | 65.80–44.40% |
| 5 | Organic cosolvent | 0–10% | 8–99% |
| 6 | Pigment | 0–30% | 5–20% |
| 7 | Monomeric plasticizer | 0–3% | 1–2% |
| 8 | Bonding agent | 0–.50% | 0.10–0.30% |
| 9 | Antifoaming agent | 0–.50% | 0.10–0.30% |
| 10 | Wetting agent | 0–1.00% | 0.25–0.75% |
| | (Total) | (100.00) | (100.00) |

Characteristically, Composition A preferably has a viscosity that is believed to be in the range of about 15,000 cps to about 25,000 cps (centipoises) measured with a Brookfield viscometer at 25° C. operating at 20 rpm spindle speed with a No. 4 spindle.

Preferably the water employed in the practice of this invention is filtered and is either deionized or distilled. A present preference is to employ a water and organic water miscible cosolvent medium comprised of about 85 to about 90 weight percent water with the balance up to 100 weight percent on a total solvent composition weight basis thereof being the cosolvent (as above characterized).

Composition B

Composition B is prepared by dissolving the cationic quaternized cellulose ether in water. The preferred compositional characteristics of Composition B are identified in Table III:

TABLE III

| | COMPOSITION B | | |
|---|---|---|---|
| | | Weight Percent (100% Basis) | |
| ID# | Component | Broad Range | Presently Most Preferred |
| 1 | Water | 95–99.5 | 98.00 |
| 2 | Cationic quaternized cellulose ether | 0.5–5 | 2.00 |
| | (Total) | (100.00) | (100.00) |

Characteristically, Composition B preferably has a viscosity that is believed to be in the range of about 50,000 to about 55,000 centipoises measured at 25° C.

with a Brookfield viscometer using a No. 4 spindle operating at a spindle speed of 20 rpm.

Composition C

Composition C is prepared by dissolving a peptizing agent in water and then dispersing a water swellable clay in the resulting solution. In general, the respective amount employed of each material is such that the resulting aqueous system forms a gel. As indicated above, the presently most preferred clay is a synthetic sodium magnesium lithium hectorite clay, and the presently most preferred peptizing agent is tetrasodium pyrophosphate. Composition C is preferably characterized as shown in Table IV:

TABLE IV

COMPOSITION C

| ID# | Component | Weight Percent (100% Basis) | |
|---|---|---|---|
| | | Broad Range | Presently Most Preferred |
| 1 | Water | 88–95% | 89.40 |
| 2 | Clay | 5–10% | 9.50 |
| 3 | Peptizing Agent | 0.50–2.0% | 1.10 |
| | (Total) | (100.00) | (100.00) |

Characteristically, Composition C preferably has a viscosity that is believed to be in the range of about 80,000 to about 90,000 cps measured at 25° C. with a Brookfield viscometer operating with a No. 4 spindle at a spindle speed of 20 rpm. Characteristically also, Composition C is a thixotropic gel.

(d) Preferred Blending Procedures

Compositions A, B and C are usable in various combinations to prepare disperse phase compositions which are then broken up under mixing shear force to form disperse phase bodies in a continuous phase comprised of a diluted Composition C.

Referring to the flow sheet in the appended drawing, which is submitted to be self-explanatory, it is seen that a Composition A is blended with either Composition B or Composition C, and preferably with both such Compositions B and C, to prepare a disperse phase composition which is homogeneous. The preferred weight ratios of Composition A to such Compositions B and/or C, as the case may be, and also the preferred viscosities of the resulting disperse phase blend homogeneous compositions, are as shown in Table V below:

TABLE V

DISPERSE PHASE COMPOSITIONS

| I.D. No. | Disperse Phase Composition of | Preferred Approx. Weight Ratio of Composition A to Other Composition(s) (B or B + C) | Preferred Approx. Viscosity Range (CPS) of Blended Disperse Phase Composition[1] |
|---|---|---|---|
| 1 | A + B | 85:15 to 80:20 | 25,000–27,500 |
| 2 | A + C | 85:15 to 80:20 | 30,000–33,000 |
| 3 | A + B + C | 70:15:15 to 80:10:10 | at least 35,000[2] |

Table V footnotes
[1]All viscosities are measured in centipoises at 25° C. with a Brookfield viscometer using a No. 4 spindle operating at 25° C.
[2]More preferably, this viscosity is not greater than about 85,000 centipoises (so measured).

The disperse phase compositions are conveniently prepared using simple mechanical blending procedures and conventional mixing apparatus with the amount of mixing shear force used being at least sufficient to produce a uniform and homogeneous product blend. As shown in Table V, the viscosity of a resulting disperse phase composition appears to be characteristically greater than that of the Composition A that is incorporated thereinto.

As indicated, preferred disperse phase compositions incorporate all three of the Compositions A, B and C. While such an (A+B+C) composition can be prepared by any convenient procedure, such as by first blending together Compositions A and B or Compositions A and C, and then further blending with the resulting blend a third Composition (either Composition C or B, as the case may be), it is presently preferred to first mix together Composition A and C in a weight ratio within the range shown in Table V and then thereafter to mix Composition B therewith using a weight ratio sufficient to achieve a mixing weight ratio as shown in Table V for all three of such Compositions A, B and C.

An (A+B+C) composition characteristically appears to have a viscosity that is greater than either as (A+B) composition or an (A+C) composition. It is theorized, and there is no intent herein to be bound by theory, that the reason for such increase is that the cationic quaternized cellulose ether has reacted in some now unknown manner with at least one component present in the (A+B+C) composition, perhaps the carboxylated cross-linkable polymer. An (A+B+C) composition, particularly one prepared by the above indicated preferred procedure, appears to have better tack and elasticity characteristics than other such disperse phase compositions.

The (A+B), (A+C) and (A+B+C) disperse phase compositions of the present invention all appear to be novel over all known prior art teachings pertaining to multicolor aqueous disperse phase compositions, and to have higher viscosities than any previously known aqueous pigmentable composition of the type usable for the disperse phase in multicolor paints.

The (A+B), (A+C) and (A+B+C) disperse phase compositions are used to make multicolor paints of the invention by the following procedure:

First, at least two different (A+B), (A+C) or (A+B+C) compositions are each prepared, each preferably being made by the preferred procedure described above. Each such (A+B), (A+C) and (A+B+C) composition of such plurality is prepared using a differently colored pigment; thus, each composition has a different apparent color. Preferably all such compositions for use in any given multicolor paint are of the same type, that is, (A+B), (A+C) and (A+B+C).

Next, the plurality of the different (A+B), (A+C) or (A+B+C) compositions are blended together with a preformed continuous phase composition which is comprised of clay, peptizing agent and water as in Composition C except that the amount of water present is approximately twice that employed in the Composition C as above characterized in Table IV. In fact, a continuous phase composition can be regarded as being a water diluted Composition C as above described though such composition can be prepared either directly from the respective starting materials involved, or indirectly from a preliminarily prepared Composition C as above described herein. The latter preparation route is presently preferred. For example, a Composition C prepared as above described usually can be diluted with water at about 1:1 weight ratio to produce a diluted Composition C that is suitable for use as a continuous phase. In general, the diluted Composition C used as a continuous phase in a multicolor paint of this invention should have at the time of blending with (A+B), (A+C), or (A+B+C) compositions a viscosity that is preferably in the range of about 35 to about 75 cps as measured at 25° C. with a Brookfield viscometer operating at 20 rpm and using a No. 4 spindle. Such viscosity is more preferably in the range of about 40 to about 50.

In general, the viscosity of the continuous phase is less than the viscosity of the gel phase composition. Preferably, the ratio of the viscosity of the continuous phase composition to the viscosity of each of the disperse phase compositions (comparably measured) is in the range of about 1:500 to about 1:1000 with a viscosity ratio range of about 1:700 to about 1:850 being presently more preferred.

The respective amounts of the individual (A+B), (A+C) and (A+B+C) compositions employed in a given multicolor paint can be varied according to the artistic preference of the formulator. Preferably, the weight ratio of the total weight of all (A+B), (A+C) and/or (A+B+C) compositions employed in a given multicolor paint of this invention to the weight of the diluted Composition C employed in such paint is in the range of about 1:1 to about 6:4, although larger and smaller such weight ratios can be used, if desired.

In a product multicolor paint of this invention, such viscosity differences between the discontinuous phase compositions and the continuous phase compositions, and such a total weight ratio of weight of total discontinuous phase compositions to weight of continuous phase composition are desirable because such result in production of a product paint wherein the disperse phase bodies form and remain suspended and discrete during subsequent paint storage.

Disperse phase (A+B), (A+C) and (A+B+C) compositions can be blended with a continuous phase composition in any order or manner. During blending, the disperse phase compositions break up and disperse to form discontinuous phase bodies in the continuous phase. The mixing shear force used in the blending is inversely proportional to the average size of the disperse phase bodies formed. The resulting dispersion constitutes a multicolor paint according to this invention.

The discontinuous phase bodies are characterized by what is believed to be unusual and surprisingly greater structural integrity compared to the structural integrity of prior art discontinuous phase bodies, such as the bodies taught, for example, in the above referenced Sellars et al. U.S. Pat. No. 3,950,283.

Various mixing procedures can be employed. When, for example, a multicolor paint of this invention is prepared wherein the discontinuous phase color bodies are to have different sizes relative to one another, one can prepare the different sized discontinuous phase bodies in separate mixing operations with different Composition C batches using different mixing shear forces. Thereafter, the different and separately prepared continuous/discontinuous phase dispersion compositions can be blended together. Preferably a mixing shear force is used in such a blending which is not larger than that used to make the largest size disperse phase bodies desired in the resulting mixed dispersions.

Study of the (A+B), (A+C) and (A+B+C) compositions indicates that each a gel and remains a gel when formed into disperse phase in a multicolor paint composition of the invention. The gel bodies formed from (A+B+C) compositions are to have the greatest internal structural integrit strength.

Once the , (A+C) and (A+B+C) compositions are broken up by mixing a diluted Composition C, the resulting disperse bodies apparently cannot and do not coalesce together a to reconstruct the respective original (A+B), (A+C) (A+B+C) compositions. Apparently, the disperse phase particles or bodies each have a crosslinked surface internal structure, and also an interfacial bonding relationship between the continuous phase and the disc phase bodies. No discrete interfacial material , such as a shell wall or the like, is believed to between the disperse phase bodies and the continuous phase.

Typically, disperse phase body particle sizes in a multicolor paint of this invention have a size in the range of about 0.2 to about 15 mm, but larger and smaller body or particle sizes can be employed, if desired.

The multicolor paint compositions of this invention are characteristically indefinitely storage stable, including shelf, shipping, thermal, and vibrational (mixing) aspects.

The excellent strength and stability characteristics of a multicolored paint composition of this invention are demonstrated by the circumstance that such a composition is characteristically sprayable by the airless spraying procedure, where high shear forces are characteristically exerted upon the formulation being so sprayed, without disperse phase color body breakdown.

While a multicolor paint formulation of this invention characteristically contains at least two distinct colors, those skilled in the art will appreciate that a particular multicolor paint formulation may contain many different classes of distinctly separately colored disperse phase bodies, perhaps six or more, each individual identically colored group of discrete disperse phase bodies having been separately preliminarily prepared as an (A+B), (A+C) or (A+B+C) disperse phase composition as hereinabove described, before the disperse phase composition is blended into the continuous phase. Various ratios and proportions of respective (A+B), (A+C) and (A+B+C) compositions relative to one another can be used in blending, as indicated above.

An optional but preferred component of a multicolor paint of this invention is a neutralizer which is used for reasons of pH control and buffering. Examples of suitable neutralizers include potassium hydroxide, ammonium hydroxide, triethanol amine, dimethylethanol amine, mixtures thereof, and the like. The amount of neutralizer used can range from greater than 0 up to about 0.6 weight percent on a 100 weight percent total paint composition basis. The neutralizer, when used, can be added at any convenient location along the blending sequence; for example, the neutralizer can be added to Composition A or to the final mixture of gel phase composition and continuous phase at the time when such are being blended together. The neutralizer can be preliminarily prepared as an aqueous solution or dispersion for ease in blending.

The compositional characteristics for a preferred class of multicolor paint compositions of this invention are summarized in the following Table VI:

TABLE VI
MULTICOLORED PAINT COMPOSITION

| | Presently Most Preferred | Preferred Range (About) |
|---|---|---|
| Water Soluble, film-forming crosslinking polymer | 5.25 | 2–20 |
| Hydroxy (alkyl) cellulose | 0.35 | 0.1–0.5 |
| Pigment | 3.50 | 2–20 |
| Crosslinking agent | 1.05 | 0.5–3 |
| Cationic Quaternized Cellulose ether | 0.15 | 0.1–2 |
| Clay | 3.09 | 1–10 |
| Peptizing agent | 0.35 | 0.1–1.0 |
| Organic co-solvent | 2.03 | 1.5–3.0 |
| Water | 83.20 | 38–92 |
| Wetting agent | 0.18 | 0.10–0.50 |
| Anti-Foaming agent | 0.07 | 0.05–0.50 |
| Monomeric Plasticizer | 0.53 | 0.10–1.0 |
| Bonding agent | 0.07 | 0.05–0.25 |
| Neutralizer | 0.18 | 0.05–0.50 |
| (Total Weight Percent) | (100.00) | (100.00) |

It will be appreciated that a multicolor paint of the present invention can generally be applied by any conventional application method desired, utilizing spraying, brushing, roller, pad, or the like.

As the applied paint coating dries on a surface, the film-forming carboxylated polymer in combination with other polymers present form a continuous film or coating in which the disperse phase bodies become located typically in adjacent relationship to one another. Both the water and the organic co-solvent (if present) evaporate. The resulting coating becomes fully cross-linked.

As the applied paint coating dries on a surface, the film-forming carboxylated polymer in combination with other polymers present form a continuous film or coating in which the disperse phase bodies become located typically in adjacent relationship to one another.

A product dried coating displays excellent properties, especially water resistance, as well as abrasion (wear) resistance, thermal stability, washability, surface smoothness, and the like.

If and when it is desired to formulate a multicolor paint of this invention so that the color dots in an applied and dried coating formed therefrom are in a spaced, but adjacent, relationship to one another, as distinct from being in adjacent contacting relationship with one another, one can simply admix with a product multicolor paint prepared as herein above described a quantity of a Composition A which has been pigmented or otherwise colored (as with a dye or the like) so as to have a color that is different from that used in the discrete bodies incorporated into the paint.

Such a Composition A thus adds to, and admixes uniformly with, the continuous phase so that the continuous phase becomes pigmented (colored) and also incorporates a water dispersable, film-forming, crosslinking binder composition. As a result of such an admixing, the viscosity of the continuous phase increases. It now appears that, once a multicolor paint of this invention has been prepared by blending procedures such as hereinabove described, the continuous phase thereof can be thickened (that is, have its viscosity increased), if desired. However, it now appears desirable to keep the viscosity of such a thickened continuous phase below about 5000 cps measured with a Brookfield viscometer at 25° C. using a No. 4 spindle operating at 20 rpm. Depending upon conditions and additives, however, the resulting multicolor paint may not display the same high water resistance compatibilities that are characteristic of the preferred multicolor paints of this invention which do not contain any colorant or film-forming polymer in the continuous phase.

The invention is further illustrated by the following examples.

Examples 1 and 2. Preparation of First and Second "Composition "A"

Two embodiments of "Composition A" are prepared by blending together the following components in the respective amounts indicated using a Cowles blade operating at about 450 to about 1500 rpm in a mixer:

| FIRST & SECOND "COMPOSITION A" | | |
|---|---|---|
| | Ex. 1 | Ex. 2 |
| Water | 42.02 | 42.02 |
| Wetting agent (Tamol 165) | .50 | .50 |
| Antifoaming agent (Nopco NXZ) | .20 | .20 |
| Hydroxyethyl cellulose (Cellosize QP-100-MH) | 1.00 | 1.00 |
| Titanium Dioxide (Dupont R-900) | 10.00 | — |
| Bone Black (Ebonex 3D) | — | 8.20 |
| Barium Sulfate (Barytes) | — | 1.80 |
| Carboxylated Styrene Acrylate Copolymer (Pliolite 7103) | 33.33 | 33.33 |
| Butyl Benzyl Phthalate (Santicizer 160) | 1.50 | 1.50 |
| Organo Functional Silane (A-187) | .20 | .20 |
| Ester Alcohol (Texanol) | 1.25 | 1.25 |
| Ethylene Glycol Butyl Ether (Butyl Cellosolve) | 3.50 | 3.50 |
| Carbodiimide (UCARLINK XL-25-SE) | 6.00 | 6.00 |
| Ammonium Hydroxide (28% Ammonia) | .50 | .50 |
| (Total Weight Percent) | (100.00) | (100.00) |

The "Composition A" of Example 1 has a white color and its Brookfield viscosity is about 20,000 cps measured at 25° C. using a No. 4 spindle operating at 20 rpm, and the "Composition B" of Example 2 has a black color and its Brookfield viscosity is about 25,000 cps similarly measured.

Example 3. Preparation of "Composition B"

A "Composition B" is prepared by blending together the following components in the respective amounts indicated using a Cowles blade operating at about 1000 to about 2500 rpm in a mixer:

| Water | 98.00 |
|---|---|
| Cationic quaternized cellulose ether Polyquaternium-10 (UCARE Polymer JR-30) | 2.00 |
| (Total Weight Percent) | (100.00) |

The Brookfield viscosity of the resulting "Composition B" is about 50,000 cps measured at 25° C. using a No. 4 spindle operating at 20 rpm.

Example 4. Preparation of "Composition C"

A "Composition C" is prepared by blending together the following components in the respective amount indicated using a Cowles blade operating at about 750 to about 2000 rpm in a mixer:

| Water | 89.40 |
|---|---|
| Synthetic sodium magnesium lithium hectorite clay (Laponite RDS) | 9.50 |
| Peptizing agent (tetrasodium pyrophosphate | 1.10 |

-continued

| | |
|---|---|
| (Total Weight Percent) | (100.00) |

The Brookfield viscosity of the resulting "Composition C" is about 85,000 cps measured at 25° C. using a No. 4 spindle operating at 20 rpm.

Example 5. Preparation of First Disperse Phase Gel Composition

A first disperse phase gel composition is prepared by blending together the following indicated amounts of each of Examples 1 and 3 using a Cowles blade operating at about 800 to 1500 rpm in a mixer:

| | |
|---|---|
| "Composition A" Example 1 (white) | 82.40 |
| "Composition B" Example 3 | 17.60 |
| (Total Weight Percent) | (100.00) |

The Brookfield viscosity of the resulting gel composition is about 26,000 cps measured at 25° C. using a No. 4 spindle operating at 20 rpm.

Example 6. Preparation of First Disperse Phase Gel Composition

A first disperse phase gel composition is prepared by blending together the following indicated amounts of each Examples 1 and 4 using a Cowles blade operating at about 1000 to about 2000 rpm in a mixer:

| | |
|---|---|
| "Composition A" Example 1 (white) | 82.40 |
| "Composition c" Example 4 | 17.60 |
| (Total Weight Percent) | (100.00) |

The Brookfield viscosity of the resulting gel composition is about 31,000 cps measured at 25° C. using a No. spindle operating at 20 rpm.

Example 7. Preparation of First Disperse Phase Gel Composition

A first disperse phase gel composition is prepared by blending together the following indicated amounts of each Examples 1, 3 and 4 using a Cowles blade operating at about 1000 to about 2500 rpm in a mixer:

| | |
|---|---|
| "Composition A" Example 1 (white) | 70.00 |
| "Composition B" Example 3 | 15.00 |
| "Composition C" Example 4 | 15.00 |
| (Total Weight Percent) | (100.00) |

The Brookfield viscosity of the resulting gel composition is about 35,000 cps measured at 25° C. using a No. 4 spindle operating at 20 rpm.

Example 8. Preparation of Second Disperse Phase Gel Composition

A second disperse phase gel composition is prepared by blending together the following indicated amounts of each Examples 2 and 3 using a Cowles blade operating at about 800 to 1500 rpm in a mixer:

| | |
|---|---|
| "Composition A" Example 2 (black) | 82.40 |
| "Composition B" Example 3 | 17.60 |
| (Total Weight Percent) | (100.00) |

The Brookfield viscosity of the resulting gel composition is about 29,500 cps measured at 25° C. using a No. 4 spindle operating at 20 rpm.

Example 9. Preparation of Second Disperse Phase Gel Composition

A second disperse phase gel composition is prepared by blending together the following indicated amounts of each Examples 2 and 4 using a Cowles blade operating at about 1000 to about 2000 rpm in a mixer:

| | |
|---|---|
| "Composition A" Example 2 (black) | 82.40 |
| "Composition C" Example 4 | 17.60 |
| (Total Weight Percent) | (100.00) |

The Brookfield viscosity of the resulting gel composition is about 32,000 cps measured at 25° C. using a No. 4 spindle operating at 20 rpm.

Example 10. Preparation of Second Disperse Phase Gel Composition

A second disperse phase gel composition is prepared by blending together the following indicated amounts of each Examples 2, 3 and 4 using a Cowles blade operating at about 1000 to about 2500 rpm in a mixer:

| | |
|---|---|
| "Composition A" Example 2 (black) | 70.00 |
| "Composition B" Example 3 | 15.00 |
| "Composition C" Example 4 | 15.00 |
| (Total Weight Percent) | (100.00) |

The Brookfield viscosity of the resulting gel composition is about 37,500 cps measured at 25° C. using a No. 4 spindle operating at 20 rpm.

Example 11. Preparation of Multicolor Paint (Black & White)

First, "Composition C" of Example 4 is blended with an equal weight of water to produce a diluted "Composition C" having a Brookfield viscosity of about 45 cps measured at 25° C. using a No. 4 spindle operating at 20 rpm.

Second, the first disperse phase composition of Example 5 and the second disperse phase composition of Example 8 are blended with such diluted "Composition C". The resulting blend is a multicolor paint.

Throughout the preparation, a Cowles blade in a mixer operates in the range of about 400 to about 500 rpm is employed. The disperse phase bodies produced in the second blending step have a size believed to be in the range of about 3 to about 5 millimeters. The Brookfield viscosity of the product multicolor paint is in the range of about 750 to about 1500 cps similarly measured. The paint composition is as follows:

| | |
|---|---|
| Water | 25.00 |
| "Composition C" Example 4 | 25.00 |
| First Disperse phase - Example 5 (white) | 25.00 |
| Second Disperse phase - Example 8 (black) | 25.00 |
| (Total Weight Percent) | (100.00) |

Example 12. Preparation of Multicolor Paint (Black & White)

First, "Composition C" of Example 4 is blended with an equal weight of water to produce a diluted "Composition C" having a Brookfield viscosity of about 45 cps measured at 25° C. using a No. 4 spindle operating at 20 rpm.

Second, the first disperse phase composition of Example 5 and the second disperse phase composition of Example 8 are blended with such diluted "Composition C". The resulting blend is a multicolor paint.

Throughout the preparation, a Cowles blade in a mixer operates in the range of about 400 to about 500 rpm is employed. The disperse phase bodies produced in the second blending step have a size believed to be in the range of about 3 to about 5 millimeters. The Brookfield viscosity of the product multicolor paint is in the range of about 750 to about 1500 cps similarly measured. The paint composition is as follows:

| Water | 25.00 |
|---|---|
| "Composition C" Example 4 | 25.00 |
| First Disperse phase - Example 5 (white) | 25.00 |
| Second Disperse phase - Example 8 (black) | 25.00 |
| (Total Weight Percent) | (100.00) |

Example 12. Preparation of Multicolor Paint (Black & White)

First, "Composition C" of Example 4 is blended with an equal weight of water to produce a diluted "Composition C" having a Brookfield viscosity of about 45 cps measured at 25° C. using a No. 4 spindle operating at 20 rpm.

Second, the first disperse phase composition of Example 6 and the second disperse phase composition of Example 9 are blended with such diluted "Composition C". The resulting blend is a mutlicolor paint.

Throughout the preparation, a Cowless blade in a mixer operates in the range of about 400 to about 500 rpm is employed. The disperse phase bodies produced in the second blending step have a size believed to be in the range of about 3 to about 5 millimeters. The Brookfield viscosity of the product multicolor paint is in the range of about 750 to about 1500 cps similarly measured. The paint composition is as follows:

| Water | 25.00 |
|---|---|
| "Composition C" Example 3 | 25.00 |
| First Disperse phase - Example 6 (white) | 25.00 |
| Second Disperse phase - Example 9 (black) | 25.00 |
| (Total Weight Percent) | (100.00) |

Example 13. Preparation of Multicolor Paint (Black & White)

First, "Composition C" of Example 4 is blended with an equal weight of water to produce a diluted "Composition C" having a Brookfield viscosity of about 45 cps measured at 25° C. using a No. 4 spindle operating at 20 rpm.

Second, the first disperse phase composition of Example 7 and the second disperse phase composition of Example 10 are blended with such diluted "Composition C". The resulting blend is a multicolor paint.

Throughout, a Cowles blade in a mixer operates in the range of about 400 to about 500 rpm. is employed. The disperse phase bodies produced in the second blending step have a size believed to be in the range of about 3 to about 5 millimeters. The Brookfield viscosity of the product multicolor paint is in the range of about 750 to about 1500 cps similarly measured. The paint composition is as follows:

| Water | 25.00 |
|---|---|
| "Composition C" Example | 25.00 |
| First Disperse phase - Example 7 (white) | 25.00 |
| Second Disperse phase - Example 10 (black) | 25.00 |
| (Total Weight Percent) | (100.00) |

Example 14. Application of the Multicolor Paint

Each of the multicolor paints of Examples 11, 12 and 13 is applied by using each of:

(1) a conventional sprayer (a pressure pot gun-type Binks Model 62 and also Model 2001 with internal mixing fitted with a #6 fluid nozzle and a #200 tip using an air pressure of 30 psi and a fluid pressure of 30 psi); and (2) an airless sprayer (a gun-type Graco Model PT 2500 with pump and a #517 tip and using an application pressure of 200 psi at the gun tip).

It is found that a uniform black and white multicolor coating is produced from each paint. Each coating dries to a tack free film (or coating) in about 30 minutes in air. Maximum film properties are attainable after an additional post curing time of 96 hours in air.

Each such fully cured coating is found to pass the ASTM No. D-1308-79 water spot test, both opened and covered.

Drying time of a coated paint can be accelerated by forced air drying at 125°-150° F.

Examples 15 Through 20. Embodiments

When each of the water soluble, film-forming, cross-linkable carboxylated polymers shown in Table VII below is substituted for the carboxylated sytrene acrylate copolymer employed in Examples 1 and 2, and then when each of such resulting "Compositions A" are then used to prepare multicolor paints as described in the procedures of Examples 7, 10 and 13, a multicolor paint is produced which, when coated as described in Example 14, is found to pass the water spot tests of ASTM D-1308-79.

| OTHER EMBODIMENTS USING CROSS LINKABLE WATER SOLUBLE POLYMERS | | | | | | | | |
|---|---|---|---|---|---|---|---|---|
| Example No. | 15 | 16 | 17 | 18 | 19 | 20 | 21 | 22 |
| Water | 37.85 | 37.85 | 42.02 | 50.76 | 42.02 | 41.95 | 37.85 | 45.35 |
| Wetting agent (Tamol 165) | .50 | .50 | .50 | .50 | .50 | .50 | .50 | .50 |
| Antifoaming agent (Nopco NXZ) | .20 | .20 | .20 | .20 | .20 | .20 | .20 | .20 |
| Hydroxy ethyl cellulose (QP-100-MH Cellosize) | 1.00 | 1.00 | 1.00 | 1.00 | 1.00 | 1.00 | 1.00 | 1.00 |
| Titanium Dioxide (Dupont R-900) | 10.00 | 10.00 | 10.00 | 10.00 | 10.00 | 10.00 | 10.00 | 10.00 |
| Carboxy-modified acrylic (Hycan 26171) | 37.50 | | | | | | | |
| Carboxy-modified (Hycan 26092) | | 37.50 | | | | | | |
| Carboxy-modified vinyl chloride (Geon 460X45) | | | 33.33 | | | | | |
| Carboxy-modified vinylidene Copolymer (Geon 450X61) | | | | 24.59 | | | | |
| Carboxy-modified special Acrylonitrile (Hycan 1572) | | | | | 33.33 | | | |

-continued

| OTHER EMBODIMENTS USING CROSS LINKABLE WATER SOLUBLE POLYMERS | | | | | | | | |
|---|---|---|---|---|---|---|---|---|
| Example No. | 15 | 16 | 17 | 18 | 19 | 20 | 21 | 22 |
| Carboxy-modified Styrene Butadiene (Goodrite 2570X59) | | | | | | 25.42 | | |
| Carboxy-modified Vinyl Acetate (Polyco 2142) | | | | | | | 37.50 | |
| Carboxy-modified Styrene Butadiene (Darex 5101) | | | | | | | | 30.00 |
| Butyl Benzyl Phthalate (Santicizer 160) | 1.50 | 1.50 | 1.50 | 1.50 | 1.50 | 1.50 | 1.50 | 1.50 |
| Organo Functional Silane (A-187) | .20 | .20 | .20 | .20 | .20 | .20 | .20 | .20 |
| Ester Alcohol (Texanol) | 1.25 | 1.25 | 1.25 | 1.25 | 1.25 | 1.25 | 1.25 | 1.25 |
| Ethylene Glycol butyl ether (Butyl Cellosolve) | 3.50 | 3.50 | 3.50 | 3.50 | 3.50 | 3.50 | 3.50 | 3.50 |
| Carbodiimide (UCALINK XL-25-SL) | 6.00 | 6.00 | 6.00 | 6.00 | 6.00 | 6.00 | 6.00 | 6.00 |
| Ammonium Hydroxide (28% Ammonia) | .50 | .50 | .50 | .50 | .50 | .50 | .50 | .50 |

In Examples 1, 2, 15, 16, 17, 18, 19, 20, 21, and 22, the hydroxyethyl cellulose can be replaced with:
A) hydroxymethyl cellulose (Dow A type);
B) hydroxypropyl cellulose (Aqualon Klucel S-97A type); and
C) sodium carboxy methyl cellulose (Aqualon CMC-7-7H3SF).

In Examples 1, 2, 15, 16, 17, 18, 19, 20, 21, and 22, the carbodiimide crosslinker can be replaced by the polyfunctional aziridine crosslinking agent "Zama-7" from Virgina chemicals.

In Example 4, the "Composition C" hectorite clay (Laponite RDS) can be replaced by:
A) Laponite RD;
B) Veegum T; and
C) Macaloid.

In Example 3, the "Composition C" peptizing agent (tetrasodium pyrophosphate) can be replaced by:
A) sodium pyrophosphate;
B) sodium tripolyphosphate; and
C) sodium hexametaphosphate.

While the foregoing description makes use of illustrative examples of various types, no limitations upon the present invention are to be implied or inferred therefrom.

What is claimed is:

1. A method for making a multicolor water-in-water paint comprising the steps of:
   (A) providing a first composition comprising on a 100 weight percent basis:
      (a) about 10 to about 40 weight percent dissolved, water dispersable, film-forming, crosslinkable, carboxylated polymer,
      (b) about 0.5 to about 2 weight percent dissolved hydroxy (lower alkyl) cellulose,
      (c) about 0.5 to about 10 weight percent dissolved crosslinking agent selected from the group consisting of polyfunctional aziridines and multifunctional carbodiimides,
      (d) about 0 to about 30 weight percent dispersed pigment,
      (e) about 0 to about 10 weight percent organic cosolvent, and
      (f) about 44.4 to about 65.8 weight percent water;
   (B) providing a second composition comprising on a 100 weight percent basis:
      (a) about 0.5 to about 5 weight percent dissolved cationic quaternized cellulose ether, and
      (b) about 95 to about 99.5 weight percent water;
   (C) providing a third composition comprising on a 100 weight percent basis:
      (a) about 0.5 to about 2 weight percent dissolved peptizing agent,
      (b) about 5 to about 10 weight percent dispersed water swellable clay, and
      (c) about 88 to about 95 weight percent water;
   (D) blending said first composition with a composition selected from the group consisting of:
      (a) said second composition in the weight ratio range of about 85:15 through about 80:20 of said first composition to said second composition,
      (b) said third composition in the weight ratio range of about 85:15 to about 80:20 of said first composition to said third composition, and
      (c) a combination of said second composition and said third composition in the weight ration range of about 70:15:15 to about 80:10:10 of said first composition to said second composition to said third composition so as to produce a first disperse phase gel composition having a viscosity in the range of about 25,000 to about 85,000 centipoises;
   (E) mixing said disperse phase gel composition with a continuous aqueous liquid phase composition comprised of components as in said third composition except that the amount of water present therein is approximately twice that employed in said third composition so that the ration of the viscosity of said continuous aqueous phase composition to the viscosity of said disperse phase composition is in the range of about 1:500 to about 1:100, the mixing shear force used in said mixing being sufficient to break up said disperse phase gel composition into discrete gel bodies dispersed in said continuous aqueous phase, said mixing shear force being inversely proportional to the average size of said so formed disperse phase bodies, thereby to produce said multicolor paint.

2. A water-in-water multicolor paint comprising a discontinuous aqueous phase dispersed in a continuous aqueous phase,
   said discontinuous aqueous phase being comprised of a plurality of discrete gel bodies, such gel bodies being comprised of a uniform aqueous composition containing in admixture:
   water dispersable, film-forming, crosslinkable carboxylated polymer,
   crosslinking agent selected from the class consisting of multifunctional carbodiimides and polyfunctional aziridines,
   cellulose material selected from the class consisting of hydroxy (lower alkyl) cellulose and alkali metal carboxylated (lower alkyl) cellulose, and
   at least one gel former selected from the class consisting of cationic quaternized ethyl cellulose, and preformed gel comprised of water-swellable clay, peptizing agent and water; and
   said continuous aqueous phase comprising a preformed gel comprised of water swellable clay, peptizing agent and water, the viscosity of said continuous phase being less than the viscosity of said discontinuous phase measured under comparable conditions, said paint having been prepared by the process of claim 1.

3. The paint of claim 1 wherein said crosslinkable carboxylated polymer is a carboxylated styrene acrylate copolymer.

4. The paint of claim 1 wherein said crosslinkable polymer is a carboxylated styrene acrylate copolymer, said crosslinking agent is a multi-functional carbodiimide, said clay is a synthetic hectorite, and said peptizing agent is tetrasodium pyrophosphate, both of said gel formers are present, and a least some of the said gel bodies are pigmented.

5. The paint of claim 1 wherein said discontinuous phase includes an organic water miscible cosolvent.

6. The paint of claim 1 wherein said continuous phase further includes in admixture therewith
 a water dispersable, film-forming crosslinkable carboxylated polymer,
 a crosslinking agent selected from the class consisting of multifunctional carbodiimides and polyfunctional aziridines,
 a cellulose material selected from the class consisting of hydroxy (lower alkyl) cellulose and alkali metal carboxylated (lower alkyl) cellulose, and
 pigment.

7. The paint of claim 1 wherein the weight ratio of the weight of said disperse phase to the weight of said continuous phase is in the range of about 1:1 to about 6:4.

8. The method of claim 1 wherein said crosslinkable polymer is a carboxylated styrene acrylate copolymer, said crosslinking agent is a multifunctional carbodiimide, said clay is a synthetic hectorite, and said peptizing agent is tetrasodium pyrophosphate, both of said gel formers are present, said step (D) is repeated a plurality of times, and each one of the resulting so produced plurality of disperse phase gel compositions has a different color in relation to the others thereof, and each one of said disperse phase gel compositions is so mixed as in step (E).

9. The method of claim 1 wherein the weight ratio of the total weight of said disperse phase gel compositions to the weight of said aqueous liquid phase composition is in the range of about 1:1 to about 6:4.

10. A coating produced by applying a continuous layer of a paint of claim 1 to a surface and then drying said so applied layer.

11. A coating produced by applying a continuous layer of a paint of claim 4 to a surface and then drying said so applied layer.

12. The method of claim 1 wherein in said blending step (D) said first composition is so blended with said combination of said second composition and said third composition to produce said first disperse phase gel composition.

13. The method of claim 1 wherein a second disperse phase gel composition is prepared by said steps (A) through (D), said second disperse phase composition contains a pigment which results in a different coloration for said second disperse phase gel composition relative to said first disperse phase gel composition and said second disperse phase composition is likewise additionally mixed with said continuous phase composition and broken up into discrete gel bodies using a mixing procedure as taught in said step (E), thereby to produce a multicolor water-in-water paint.

14. The method of claim 1 wherein a plurality of further disperse phase gel compositions are prepared each by said steps (A) through (D), each of said further disperse phase gel compositions containing a pigment which is different from all others of said disperse phase gel compositions, and each of said further disperse phase compositions is mixed with said continuous phase composition and broken up into discrete gel bodies using a mixing procedure as taught in said step (E), thereby to produce a multicolor water-in-water paint.

15. A paint of claim 1 wherein said discontinuous aqueous phase is produced by blending in said process step (D) said first composition with said combination of said second composition and said third composition in the weight ratio range of about 70:15:15 to about 80:10:10 of said first composition to said second composition to said third composition.

16. A gel composition adapted for use as the disperse phase in a multicolor paint which gel composition is produced by the steps of:
 (A) providing a first composition comprising on a 100 weight percent basis:
  (a) about 10 to about 40 weight percent dissolved, water dispersable, film-forming, crosslinkable, carboxylated polymer,
  (b) about 0.5 to about 2 weight percent dissolved hydroxy (lower alkyl) cellulose,
  (c) about 0.5 to about 10 weight percent dissolved crosslinking agent selected from the group consisting of polyfunctional aziridines and multifunctional carbodiimides,
  (d) about 0 to about 30 weight percent dispersed pigment,
  (e) about 0 to about 10 weight percent organic cosolvent, and
  (f) about 44.4 to about 65.8 weight percent water;
 (B) providing a second composition comprising on a 100 weight percent basis:
  (a) about 0.5 to about 5 weight percent dissolved cationic quaternized cellulose ether, and
  (b) about 95 to about 99.5 weight percent water;
 (C) providing a third composition comprising on a 100 weight percent basis:
  (a) about 0.5 to about 2 weight percent dissolved peptizing agent,
  (b) about 5 to about 10 weight percent dispersed water swellable clay,
  (c) about 88 to about 95 weight percent water;
 (D) blending said first composition with a composition selected from the group consisting of:
  (a) said second composition in the weight ratio range of about 85:15 through about 80:20 of said first composition to said second composition,
  (b) said third composition in the weight ratio range of about 85:15 to about 80:20 of said first composition to said third composition, and
  (c) a combination of said second composition and said third composition in the weight ratio range of about 70:15:15 to about 80:10:10 of said first composition to said second composition to said third composition so as to produce a gel composition having a viscosity in the range of about 25,000 to about 85,000 centipoises.

17. The gel composition of claim 16 wherein in said blending step (D) said first composition is so blended with said combination of said second composition and said third composition to produce said gel composition.

* * * * *

UNITED STATES PATENT AND TRADEMARK OFFICE
CERTIFICATE OF CORRECTION

PATENT NO. : 5,114,484

DATED : May 19, 1992

INVENTOR(S) : James F. Lynch

It is certified that error appears in the above-identified patent and that said Letters Patent is hereby corrected as shown below:

Col. 8, at about line 26 (in Column for "Broad" figures, Table II), change "3-50%" to --44-89%--.

Col. 8, at about line 27 (in Column for "Preferred" figures Table II), change "99%" to --9.9%--.

Col. 11, line 10, after the numeral "50" insert --cps--.

Col. 11, line 68, after the word "each" insert --is--.

Col. 12, line 1, after the word "phase" insert --bodies--.

Col. 12, line 3, after the word "are" insert --believed--.

Col. 12, line 4, change "integrit strength" to --integrity or strength--.

Col. 12, line 5, after the word "the" insert --(A+B)--.

Col. 12, line 6, after the word "in" insert --a--.

Col. 12, line 8, change "a" to --again--.

Col. 12, line 9, after "(A+C)" insert --and/or--.

Col. 12, line 11, before the word "internal" insert --and--.

UNITED STATES PATENT AND TRADEMARK OFFICE
CERTIFICATE OF CORRECTION

PATENT NO. : 5,114,484
DATED : May 19, 1992
INVENTOR(S) : James F. Lynch

It is certified that error appears in the above-identified patent and that said Letters Patent is hereby corrected as shown below:

Col. 12, line 13, change "disc" to --discontinuous--.

Col. 12, line 14, after the word "material" insert --layer--.

Col. 12, line 15, before the word "between" insert --exist--.

Col. 12, line 17, before the word "disperse" insert --the--.

Col. 15, at about lines 38-39 (in the text below the Table), after the word "No." insert --4--.

Col. 16, starting at line 64 through Col. 17 ending at about line 23 delete the entire text of the first "Example 12".

Col. 17, at about line 36, change "Cowless" to --Cowles--.

Col. 17, at about line 46 (in Table), change "3" to --4--.

Col. 18, at about line 17 (in Table) after the word "Example" insert --4--.

Col. 18, line 45, change "20. Embodiments" to --22. Other Embodiments--.

Col. 20, at about line 36 (in Claim 1), change "ration" to --ratio--.

Col. 21, line 5 (in Claim 3), change "1" to --2--.

UNITED STATES PATENT AND TRADEMARK OFFICE
CERTIFICATE OF CORRECTION

PATENT NO.   : 5,114,484
DATED        : May 19, 1992
INVENTOR(S)  : James F. Lynch It is certified that error appears in the above-identified patent and that said Letters Patent is hereby corrected as shown below:

Col. 21, line 8 (in Claim 4), change "1" to --2--.

Col. 21, line 15 (in Claim 5), change "1" to --2--.

Col. 21, line 17 (in Claim 6), change "1" to --2--.

Col. 21, line 29 (in Claim 7), change "1" to --2--.

Col. 21, line 48 (in Claim 10), change "1" to --2--.

Col. 22, line 1 (in Claim 14), change "1" to --13--.

Col. 22, line 11 (in Claim 15), change "1" to --2--.

Signed and Sealed this

Ninth Day of November, 1993

Attest:

BRUCE LEHMAN

*Attesting Officer*   *Commissioner of Patents and Trademarks*